United States Patent [19]

Freeman et al.

[11] Patent Number: 5,661,268
[45] Date of Patent: Aug. 26, 1997

[54] METHOD OF RECALIBRATING ELECTRONIC SCALES

[75] Inventors: Gerald C. Freeman; Konstantin G. Kodonas, both of Norwalk; Paul C. Talmadge, Ansonia, all of Conn.

[73] Assignee: Pitney Bowes Inc., Stamford, Conn.

[21] Appl. No.: 364,168

[22] Filed: Dec. 27, 1994

[51] Int. Cl.$^6$ .................................................. G01G 9/00
[52] U.S. Cl. .................... 177/1; 177/50; 177/1; 364/571.01; 364/571.02
[58] Field of Search ............... 177/1, 50; 73/1 B; 364/571.01, 571.02, 571.03, 571.04

[56] References Cited

U.S. PATENT DOCUMENTS

| | | | |
|---|---|---|---|
| 3,194,050 | 7/1965 | Ruge. | |
| 3,439,524 | 4/1969 | Rogers. | |
| 4,139,892 | 2/1979 | Gudea et al. | 364/567 |
| 4,375,243 | 3/1983 | Doll | 177/25 |
| 4,418,392 | 11/1983 | Hata | 364/571 |
| 4,572,309 | 2/1986 | Nishiyama | 177/50 |
| 4,660,663 | 4/1987 | Amacher et al. | 177/50 |
| 4,760,539 | 7/1988 | Amacher et al. | 364/571 |
| 4,909,338 | 3/1990 | Vitunic et al. | 177/50 |
| 5,004,058 | 4/1991 | Langford et al. | 177/25.13 |

Primary Examiner—Michael L. Gellner
Assistant Examiner—Anh Mai
Attorney, Agent, or Firm—Melvin J. Scolnick; David E. Pitchenik; Robert H. Whisker

[57] ABSTRACT

A method of recalibrating an electronic scale is disclosed which causes the scale to indicate accurate weight measurements regardless of variations in the physical and/or environmental conditions under which the scale is operating between a site of origin and a site of installation which tend to adversely effect accurate weight. The method utilizes the removable platter of the scale as a fixed weight of indeterminate amount which is used to calibrate the scale at a site of origin under controlled physical and/or environmental conditions and to recalibrate the scale at a site of installation at which the physical and/or environmental conditions may be different from those that prevailed at the site of origin. Also disclosed is a method of obtaining an accurate indication of the weight of a mail piece placed on the platter of the scale at the site of installation regardless of the variations in physical and/or environmental conditions under which the scale operates, this method being an extension of the method for recalibrating the scale.

6 Claims, 4 Drawing Sheets

| STEP | PLATTER OFF | PLATTER ON - 0 WT | PLATTER ON - WT |
|---|---|---|---|
| 11 | | DETERMINE RAW PLATTER COUNT, WCI @ 0# - 20,600 | |
| | MAIL PIECE OF UNKNOWN WEIGHT IS PLACED ON SCALE PLATTER | | |
| 12 | | | DETERMINE RAW PLATTER COUNT WITH UNKNOWN WEIGHT, UWCI - 61,700 |
| 13 | DETERMINE 4th ELECTRONIC COUNT DIFFERENTIAL (COUNTS/UNKNOWN WEIGHT) 4th ECD = STEP 12 - STEP 11, OR $\Delta$WCI = UWCI - WCI @ 0#, OR 61,700 - 20,600 = 41,100 | | |
| 14 | CALCULATE UNKNOWN WEIGHT OF MAIL PIECE $UWI = 5\# \times \frac{STEP\ 13}{STEP\ 10} = 5\# \times \frac{\Delta WCI}{WCI} = 5\# \times \frac{41,400}{87,904} = 5 \times .4675$ UWI = 2.34# | | |

FROM FIG. 2

LEGEND FOR FIGS. 2 AND 3

ECD = ELECTRONIC COUNT DIFFERENTIAL
WCO = WEIGHT COUNT AT SITE OF ORIGIN
PCO = PLATTER COUNT AT SITE OF ORIGIN
WCI = WEIGHT COUNT AT SITE OF INSTALLATION
PCI = PLATTER COUNT AT SITE OF INSTALLATION
UWCI = UNKNOWN WEIGHT COUNT AT SITE OF INSTALLATION
UWI = UNKNOWN WEIGHT AT SITE OF INSTALLATION

METHOD OF RECALIBRATING ELECTRONIC SCALES

BACKGROUND OF THE INVENTION

The present invention relates generally to the field of electronic weighing scales, and more particularly to a method for recalibrating such scales to compensate for possible adverse effects on the accuracy of the scales of variations in physical and/or environmental conditions under which they operate.

This invention is an improvement on the invention disclosed and claimed in application Ser. Code No. 08/165,151, filed on Dec. 10, 1993 and now issued as U.S. Pat. No. 5,550,328 to Freeman et al., together with application Ser. Code No. 08/165,152, filed on Dec. 10, 1993, in the names of Gerald C. Freeman and Paul C. Talmadge, and now allowed and assigned to the assignee of this application. This application is also related to application Ser. Code No. 08/364,169, filed on Dec. 27, 1994 and now issued as U.S. Pat. No. 5,521,334 to Gerald C. Freeman, concurrently with this application in the name of Gerald C. Freeman, and assigned to the assignee of this application, and which discloses and claims an electronic scale of the type with which the recalibrating method disclosed and claimed in this application is practiced.

Since their introduction, electronic scales have become widely accepted in many weighing applications for a number of reasons, primarily the extreme degree of accuracy with which the scales can weigh articles, the wide range of weights the scales are capable of handling and the ease and convenience of digital display readout of the weight of an article. Electronic scales are now used almost exclusively in such high volume utility situations as mail, parcels, bulk food and dry goods sold by weight measure, air terminal baggage, and other situations where highly accurate weight is required on a repetitive basis with minimum recovery time between individual weighings.

In recent years, electronic scales have become almost the universal standard in connection with weighing mail and parcels, and it is in connection with this utility that the present invention was developed, although the utility of the present invention is by no means limited to this use. Perhaps the primary contributing factor to the popularity of electronic scales in the postal field is the high degree of accuracy inherent in such scales. When one considers the billions of mail pieces weighed annually by the U.S. Postal Service in the course of handling mail, and the millions of packages and parcels also handled not only by the Postal Service but also by all of the special delivery courier services which compete with the Postal Service, one can begin to appreciate the vast amount of money, by which customers will be overcharged or undercharged depending on whether scales are overweighing or underweighing, in the course of dispatching all of this mail and parcels if the scales which determine the mail and parcel postage amount are not highly accurate.

For example, a generally accepted standard of accuracy among major electronic scale manufacturers is that they be within 0.03% to 0.05% of full scale. If we assume a 100 pound scale, the required accuracy becomes 0.03 to 0.05 pounds, or 0.48 to 0.80 ounces, over the range of the scale. Thus, it is apparent that electronic scales are capable of weighing accurately to an impressive less than one ounce in 100 pounds. Correspondingly, a one pound letter scale can weigh letter mail accurately to within less than one hundredth of an ounce.

Aside from an inherent desire to provide highly accurate scales for monetary purposes described below, a major factor contributing to this high degree of accuracy is the requirement by the National Bureau of Weights and Measures that a scale be capable of weighing within the above limits of accuracy in order to be approved for commercial use in mail and parcel applications. Although many customers in other applications may not require this degree of accuracy, customers in the mail and parcel fields will not purchase scales that are not capable of National Bureau of Weights and Measures approval.

A major problem that occurs with electronic load cell scales is that the accuracy of the scales can be adversely affected by variations of certain physical and/or environmental conditions under which the scales are, required to operate. A primary physical condition is that an electronic load cell scale must be absolutely level during operation or it will not weigh accurately. Thus, if a scale is properly calibrated at the factory on a test bench known to be perfectly level, and is then transported to the field and operated on a surface that is not as level as the factory test bench, the scale will not weigh accurately. Tests have revealed that a scale resting on a surface which is tipped only a few degrees off of factory test bench level can have a weight discrepancy of as much as 0.4% to 0.5% of full scale, which translates into an accuracy of about 10 times less than the above mentioned industry standard. The reason for this is that when a scale is perfectly level, an article resting on the platform of the scale is exerting 100% of its weight in a perfectly vertical direction relative to gravity, so the scale recognizes the full weight of the article. If the scale is tipped slightly, the weight of the article recognized by the scale is no longer 100%, but rather is only a component of the weight as determined by the cosine effect, one minus the cosine of the angle that the scale is off level. The result is that the scale reads less than the true weight of the article by the amount of the above percentages, which becomes very substantial in terms of lost revenue from underweighing millions of parcels. This problem could be particularly acute in the situation where a courier service wishes to place a scale in the back of its pickup truck in order to check the accuracy of package weight provided by the customer prior to the package being delivered to the distribution center of the courier service. It is rare that a parked truck will be absolutely level, with the result that a substantial degree of error is introduced into the weight provided by the customer.

The problem is further compounded by the introduction of various environmental factors, such as variations in gravity, vibration, temperature, air movement, electronic noise, and shift errors on the platform. For example, it is known that the force of gravity varies from place to place around the world, with the result that a scale properly calibrated at the factory may not be accurate within the desired limits after it is transported a few hundred or a few thousand miles. Also, the effect of gravity varies with height, so that a scale calibrated properly at sea level may not be accurate within the desired limits in Denver. A scale properly calibrated in an air conditioned factory at a temperature of 75° F. may not be accurate when used in a non-air conditioned location with an ambient temperature of 98° F. Air movement is another contributing factor, so that a scale operating under the influence of air movement impinging on the platform from an air conditioning outlet may not be accurate after having been calibrated at the factory in still air.

Prior to the present invention and that disclosed in the prior filed applications Ser. Nos. 165,151 and 165,152, the only way to ensure that a particular scale would weigh accurately in the field was to dispatch a service technician of the scale manufacturer to the site of the scale for the purpose of recalibrating the scale after it is installed and is operating under the conditions which appertain. This obviously is not an desirable solution since it is not a cost effective procedure, it does not solve the problem of changing circumstances at the scale site, such as temperature, air movement, electronic noise, etc., and it certainly does not solve the problem of transitory scales, such as those installed in the back of courier services' pickup trucks, and finally it is most difficult on service technicians who must carry weights to the site of the scale in order to perform the calibration. Thus, it is seen that there exists a need for an effective way of recalibrating electronic scales in the field to compensate for errors in weight which are introduced by the adverse effects of physical and/or environmental conditions under which the scales operate.

The problems associated with maintaining the accuracy of the scale under different operating conditions were addressed in the prior filed applications by providing an apparatus and method for recalibrating an electronic scale in which an auxiliary weight, which is constant although not necessarily precisely known, is suitably mounted in the scale so as to be movable between a first position in which the weight is supported by a portion of the main frame of the scale, and a second position in which the weight is supported by the platter of the scale on which the item to be weighed is placed. A motor drives an eccentric mechanism which raises and lowers the auxiliary weight, either on demand to place the weight on the scale platter when the operator desires to recalibrate the scale, or automatically in response to activation of various control elements caused by various external influences, such as periodically, whenever the scale is powered up, when it senses a change in atmospheric or gravitational conditions, etc.

The major disadvantage of the apparatus and method disclosed in the prior filed applications is the need for providing the auxiliary weight device and the electric and electronic control means for periodically placing the auxiliary weight on the scale platter in order to recalibrate the scale. Although the ability to recalibrate the scale in the field automatically at periodic or predetermined times affords an advantage that is useful in large size, relatively expensive scales, this advantage is entirely lost in a small capacity scale, such as the one described hereinafter, where the cost of providing the auxiliary weight mechanism and control means thereof would be entirely prohibitive in a small capacity scale.

BRIEF SUMMARY OF THE INVENTION

The present invention satisfies the foregoing need and at least obviates if not eliminates all of the problems discussed above relating to the accuracy of electronic scales. And while the invention is disclosed herein as being practiced in conjunction with the same apparatus as that disclosed above and disclosed and claimed in the aforementioned copending application, it nevertheless can be practiced apart from that particular apparatus, and therefore has separate and unique utility in the art.

The present invention is a method of recalibrating an electronic scale to indicate accurate weight measurements of articles placed on the scale regardless of variations in the physical and/or environmental conditions under which the scale is operating between a site of origin and a site of installation and which tend to adversely affect accurate weight. The method is typically practiced in conjunction with an electronic scale which has a load cell capable of producing an analog voltage output signal indicative of the weight of an article placed on the scale, an analog to digital converter for converting the analog voltage output signal from the load cell into digital information representing the analog output, a digital readout for displaying the weight of the article, and a microprocessor for converting the digital representation of the analog output of the load cell into information for driving the digital readout to cause it to display desired information.

The major feature of improvement of the present invention over that disclosed in the prior filed applications is the elimination of the motorized auxiliary weight mechanism by which the auxiliary weight was added to the scale platter at the appropriate times, either on demand or automatically in response to some external influence. Thus, in the present invention, since the scale platter is readily removable from the scale, the platter can be used as the recalibrating weight, providing the actual weight of the platter is determined during an initial calibration process carried out at the site of origin, i.e., the factory. As a result of elimination of the prior recalibrating weight mechanism from a scale having a certain weight range, a corresponding scale can be manufactured at considerably less cost, and will be more reliable and less prone to mechanical failure, than the prior scale, both of which factors make the new scale more economically attractive than the prior scale.

Although the primary intention of the present invention is to provide a method for recalibrating small capacity scales to compensate for variations in the force of gravity, in its broader aspects, the present invention is a method of recalibrating an electronic scale to indicate accurate weight measurements of the scale regardless of variations in and of the foregoing physical and/or environmental conditions under which the scale is operating between a site of origin and a site of installation which tend to adversely affect accurate weight. The method comprises the steps of placing the scale with the platter installed thereon on a horizontal surface at a site of origin having certain controlled physical and/or environmental conditions, determining a first electronic count differential between the scale with 0# weight on the platter and with a known weight thereon and placing the first electronic count differential into a memory, determining a second electronic count differential between the scale with the platter removed and with the platter replaced thereon and placing the second electronic count differential into a memory, removing the scale from the site of origin to a site of installation at which the scale may operate under physical and/or environmental conditions different from those which prevailed at the site of origin, determining a third electronic count differential between the scale with the platter removed and with the platter replaced thereon and placing the third electric count differential into a memory, and readjusting the first electronic count differential by the product of the first electronic count differential and the ratio of the second electronic count differential to the third electronic count differential, which product is a measure of the degree of error between the reading of the scale with the known weight thereon at the site of origin and the reading of the scale if the same known weight were placed on the scale at the site of installation and placing the readjusted first electronic count differential into a memory, whereby when an object of unknown weight is placed on the scale platter at the site of installation, the electronic count differential between the scale with 0# weight thereon and with an unknown weight thereon is recalculated according to said product of said first electronic count differential and said ratio of the second electronic count differential to the third electronic count differential.

In some of its more limited aspects, the first electronic count differential is determined by determining a first electronic count of the scale with the platter installed thereon but with 0 weight on the platter, placing a known weight on the platter, determining a first electronic count of the scale with the known weight thereon, and subtracting the first electronic count of the scale with 0# weight on the platter from the first electronic count of the scale with the known weight on the platter.

The second electronic count differential is determined by determining a first electronic count of the scale with the platter removed therefrom, determining a second electronic count of the scale with the platter installed thereon but with 0# weight on the platter, and subtracting the first electronic count of the scale with the platter removed therefrom from second electronic count of the scale with 0# weight on the platter.

The third electronic count differential is determined by determining a second electronic count of the scale with the platter removed therefrom, determining a third electronic count of the scale with the platter installed thereon but with 0# weight on the platter, and subtracting said second electronic count of the scale with the platter removed therefrom from said third electronic count of the scale with the platter installed thereon but with 0# weight on the platter.

The present invention also includes a method of obtaining an accurate indication of the weight of a mail piece which is placed on the scale at a site of installation which includes all of the steps set forth above for carrying out the method of recalibrating the electronic scale, plus additional steps which are carried out subsequent to completion of the recalibration of the scale which cause the scale to provide an indication of accurate weight of the mail piece. Thus, this aspect of the invention includes the steps of placing a mail piece of unknown weight on the platter of the scale, determining a fourth electronic count differential between the scale with 0# weight on the platter and with the mail piece of unknown weight on the platter and placing the fourth electronic count differential into a memory, and calculating the unknown weight of the mail piece by multiplying the known weight placed on the scale platter at the site of origin by the ratio of the adjusted first electronic count differential to the first electronic count differential, and converting the unknown weight to information recognizable by a digital readout to cause it to display the actual weight of the mail piece, whereby the digital readout will accurately display the weight of the mail piece at the site of installation regardless of any variations in the physical and/or environmental conditions between the site of origin and the site of installation.

Having briefly described the general nature of the present invention, it is a principal object thereof to provide a method of recalibrating an electronic scale to indicate accurate weight measurements of articles placed on the scale regardless of variations in the physical and/or environmental conditions under which the scale operates between a site of origin and a site of installation and which tend to adversely affect accurate weight.

Another object of the present invention is to provide a method of recalibrating an electronic scale according to the preceding object in which a removable platter is utilized as the recalibrating weight, thereby avoiding the expense of providing a built in auxiliary weight that must be periodically added to the weight of the platter or providing a known precision weight to use for calibration purposes.

Another object of the present invention is to provide a method of obtaining an accurate indication of the weight of a mail piece placed on an electronic scale at a site of installation regardless of variations in the physical and/or environmental conditions under which the scale is operating between a site of origin and the site of installation which tend to adversely affect accurate weight.

Another object of the present invention is to provide a method of indicating accurate weight measurements of mail pieces placed on a scale as aforesaid which is applicable to a variety of electronic scales and is easy to practice by the average user of the scale.

These and other objects, advantages and features of the method of the present invention will become more apparent from an understanding of the following detailed description of a preferred embodiment of the invention when considered in conjunction with the accompanying drawings.

DETAILED DESCRIPTION OF THE INVENTION

Figure 1:
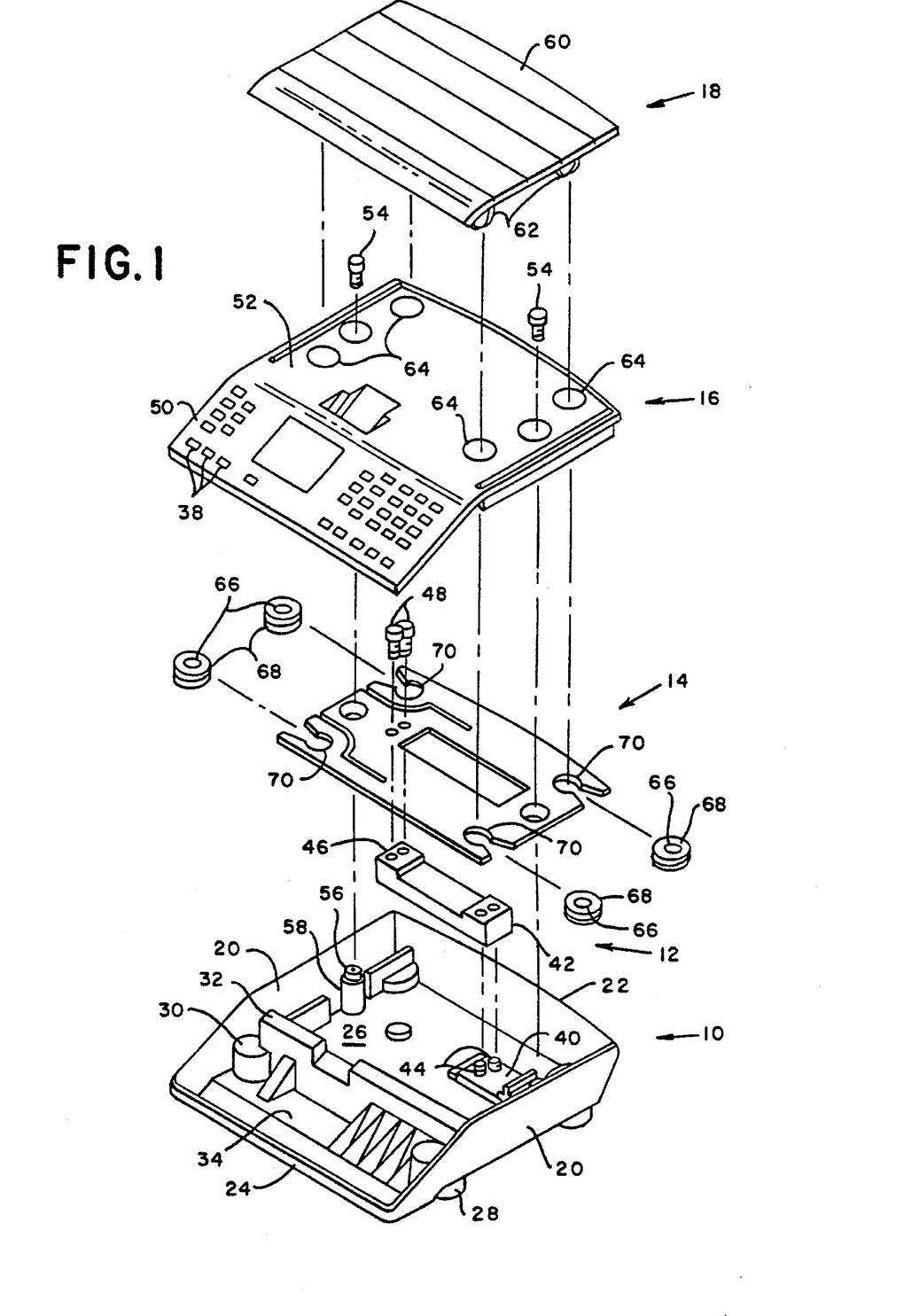
FIG. 1 is an exploded, perspective view of the major components of a representative electronic scale with which the method of the present invention is practiced.

Referring now to the drawings, and more particularly to FIG. 1 thereof, the major components of a representative scale with which the present invention is practiced are shown in an exploded manner, and are seen to comprise a housing, indicated generally by the reference numeral 10, a load cell, indicated generally by the reference numeral 12, a weight distribution plate, indicated generally by the reference numeral 14, a top cover, indicated generally by the reference numeral 16, and finally a platter, indicated generally by the reference numeral 18, on which the mail piece to be weighed is placed.

The housing 10 is generally rectangular and has oppositely disposed upstanding side walls 20, an upstanding rear wall 22, a very short, upstanding front wall 24, and a bottom wall 26 to which the side, rear and front walls are connected. A plurality of feet 28 are suitably connected to the underside of the bottom wall 26 in recesses defined by bosses 30 for supporting the scale. The housing 10, as well as the top cover 16 and the platter 18, are formed of injection molded polycarbonate blend plastic. An upstanding wall 32 extends across the housing 10 between the side walls 20 to divide the space within the base and housing 10 into forward and rearward compartments 34 and 36, the former for the electronic components which are actuated by a plurality of push buttons that extend through suitable openings 38 formed in the top cover 16, the latter for the load cell 12 and other electronic components that will not fit in the forward compartment 34.

A metal support plate 40 is suitably secured to the bottom wall 26 for supporting the fixed end 42 of the load cell 12, which is positioned on the support plate 40 and is connected to the housing 10 by suitable screws 44 which pass through openings in the bottom wall 26 and the support plate 40 and threadedly engage the fixed end 42 of the load cell 12. The opposite or free end 46 of the load cell 12 is connected to the weight distribution plate 14 by means of similar screws 48 which pass through openings in the plate 14 and are threadedly engaged with the free end 46 of the load cell 12.

The top cover 16 is dimensioned to overlie the housing 10, and includes a push button access portion 50 which includes the aforementioned button access openings 38 and overlies the forward compartment 34 in the housing 10. The remainder of the top cover 16 is a generally rectangular portion 52 which overlies the rearward compartment 36 in the housing 10. A pair of screws 54 suitably connect the rectangular portion 52 of the top cover 16 to the upper ends 56 of a pair of posts 58 to secure the top plate 16 to the housing 10.

The scale platter 18 is basically a generally rectangular body member 60 which has approximately the same dimensions as the rectangular portion 52 of the top cover, and is provided with four identical legs 62, only two of which are shown in FIG. 1. Each leg 62 extends through one of the openings 64 in the weight distribution plate 16 and seats firstly in the apertures 66 of one of a plurality of grommets 68 which in turn fit into suitable recesses 70 formed adjacent the four corners of the weight distribution plate 14. The legs 62 are gripped by the inner edges of the apertures 66 with sufficient strength to firmly retain the platter 18 on the weight distribution plate 14, but not so tightly that it cannot be readily removed by a user simply by lifting the platter upwardly. It should be noted that the openings 64 in the top cover 16 are sufficiently large to enable the legs 62 to pass freely therethrough without touching the inner edges of the apertures 66 so that the platter 18 is supported solely by the weight distribution plate 14, which, as described above, is in turn supported solely by the load cell 12.

It should be understood that the foregoing scale has been shown and described simply for the purpose of illustrating a type of electronic scale having a platter which is readily removable from the load measuring element of the scale, and that other scales having different forms of construction that permit removal of the platter from the load measuring element can be used to practice the method of the present invention.

Figure 2:
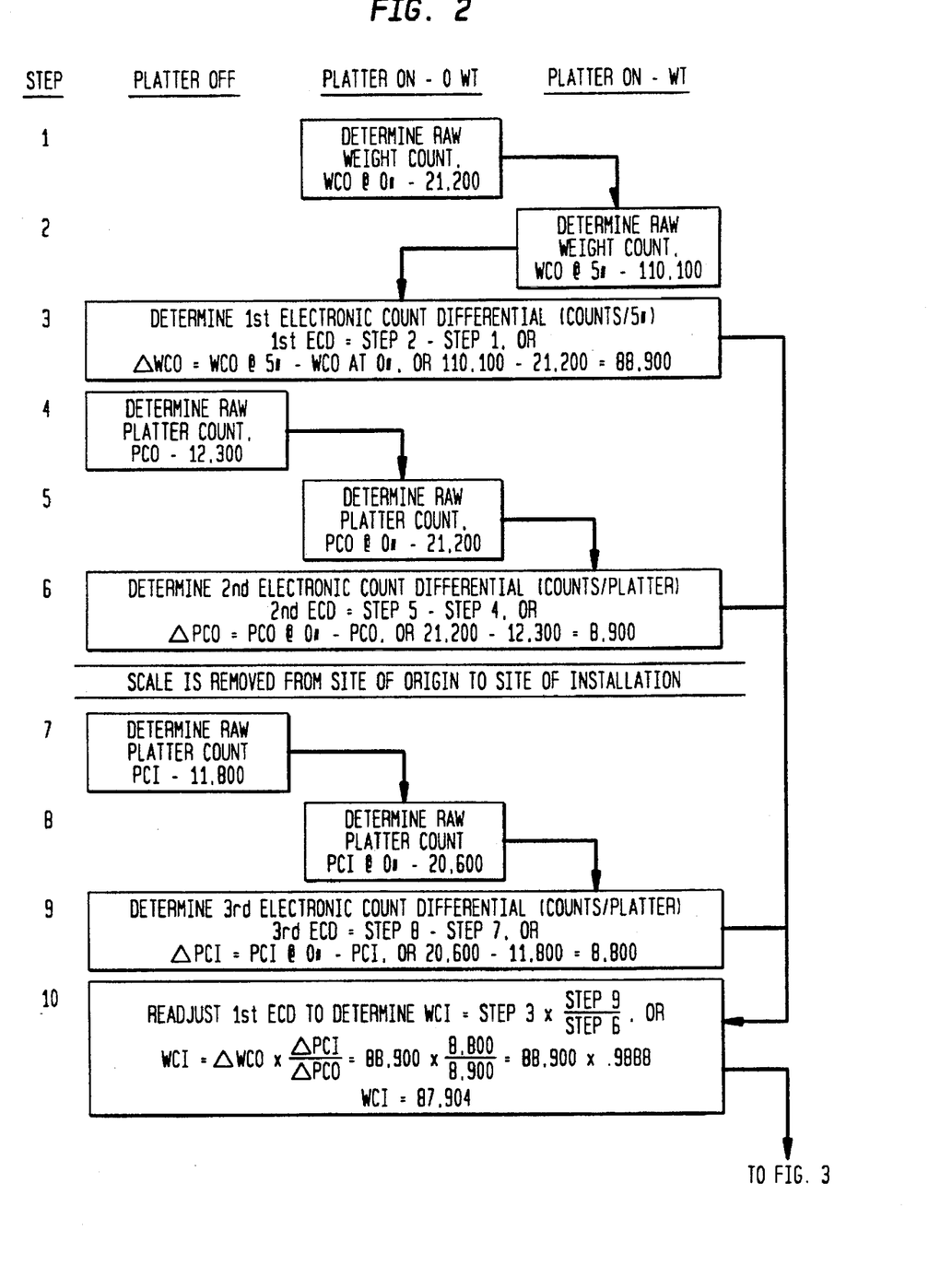
FIG. 2 is a flow chart of the series of steps required to carry out the method of recalibrating an electronic scale.
Figure 3:
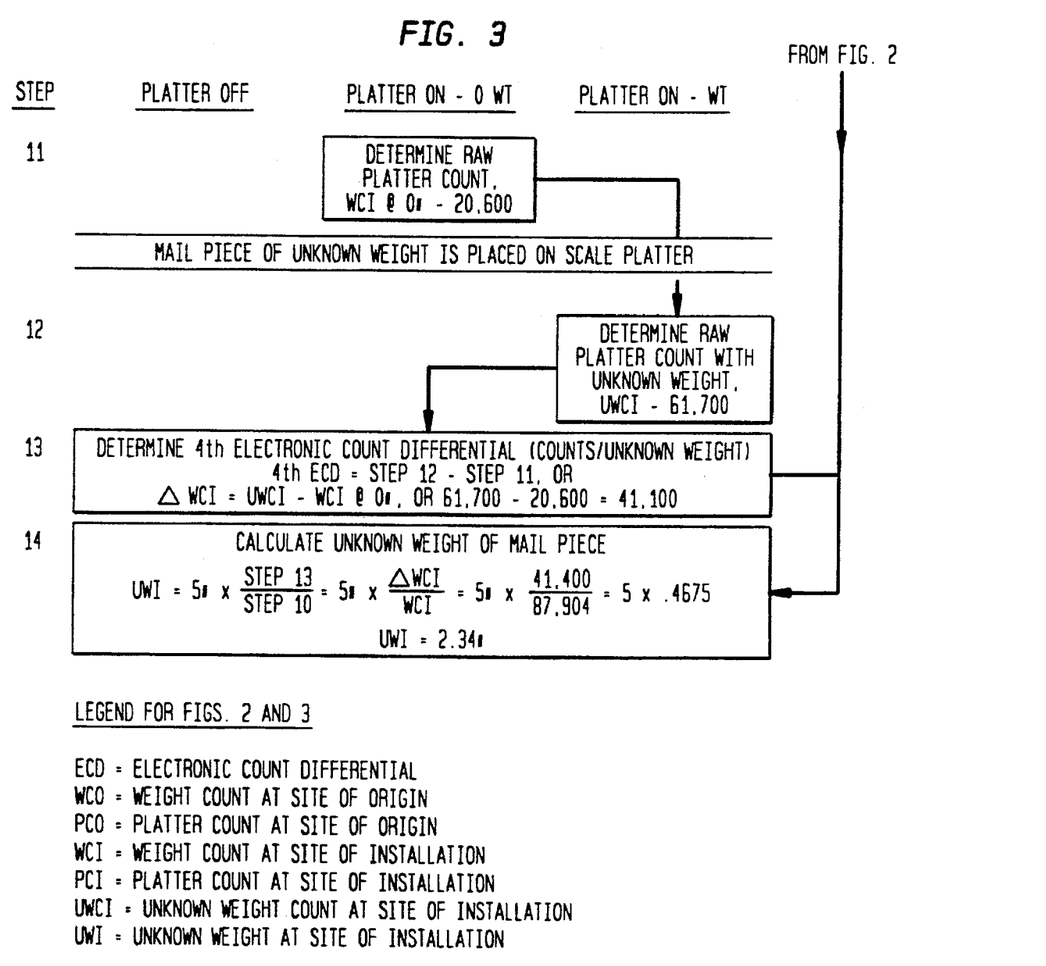
FIG. 3 is a continuation of the flow chart shown in FIG. 2, and includes the further steps required to carry out the method of obtaining an accurate indication of the weight of a mail piece.

Coming now to a detailed description of the method of the present invention, and with particular reference to FIGS. 2 and 3, in practicing the method of the invention, there are several steps that are carried out at the site of origin of the scale, typically the factory, and several that are carried out at the site of installation, invariably the location at which the scale will be used. A first series of steps is carried out at the site of origin under controlled physical and/or environmental conditions to initially calibrate the scale after manufacture against a known test weight, this series of steps being represented in FIG. 2 by the numbers 1 through 6 in the column headed STEP. A second series of steps is carried out at the site of installation to recalibrate the scale to adjust it for any changes in physical and/or environmental conditions between the two sites, this series of steps being represented by the numbers 7 through 10 in the same column. These two series of steps are those that are required to recalibrate the scale when it is moved from one location to another, or at any time that a recalibration of the scale is desired. A third series of steps, in addition to the two previous series, is carried out at the site of installation to cause the scale to display an accurate weight reading of the unknown weight of a mail piece, this series of steps being represented by the numbers 11 through 14 in the same column, but in FIG. 3.

In order to facilitate a clear understanding of the succession of steps now to be described, representative figures for the various electronic counts determined during the practice of the methods are set forth in the flow charts of FIGS. 2 and 3, together with the results of the calculation steps performed by the microprocessor. It is being assumed that the site of origin is a location at or near sea level, and that the site of installation is at a high elevation, such as Denver, Colo., where the force of gravity is less than it is at sea level. Under these circumstances, if the scale were not recalibrated at the site of installation, the weight indicator of the scale would show a weight slightly less than the true weight of a mail piece placed on the scale platter, which over a period of time, could result in a substantial underpayment of proper postage by the owner of the scale.

Figure 4:
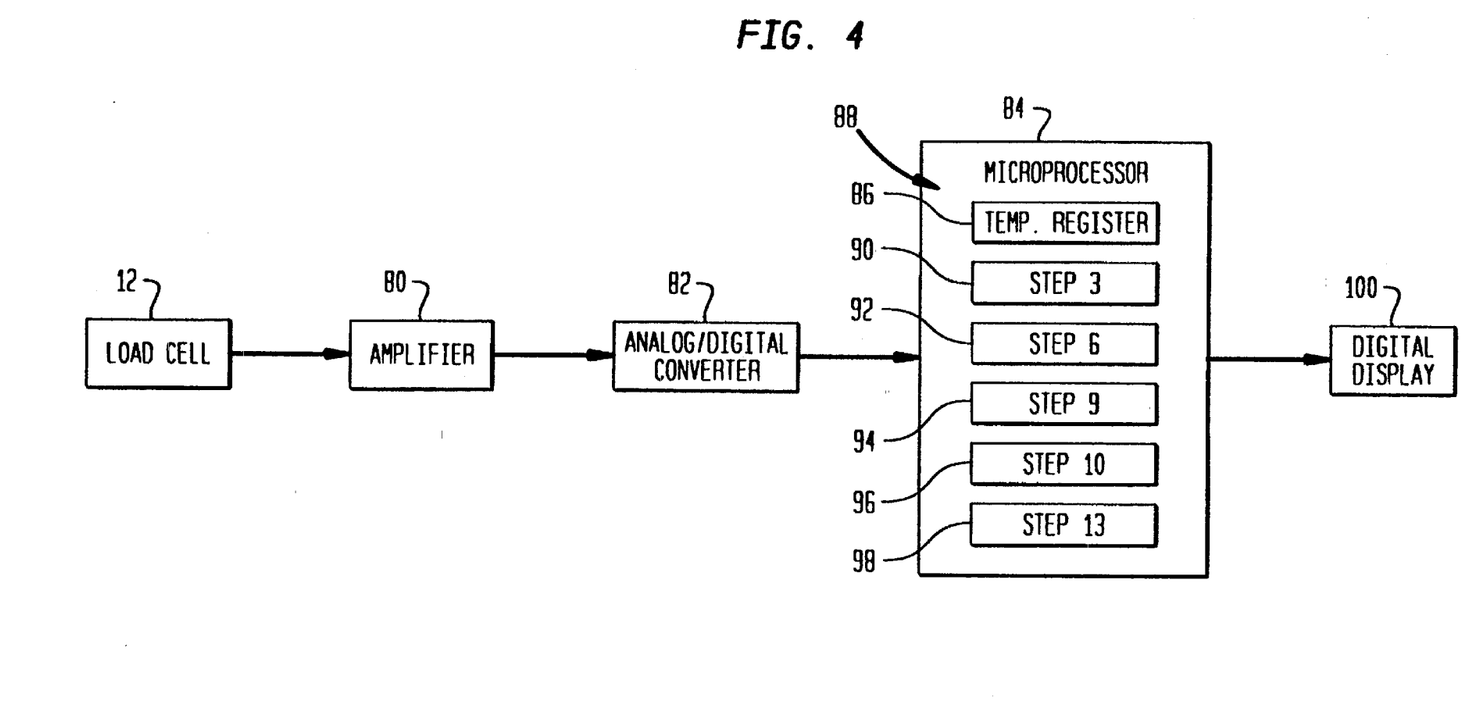
FIG. 4 is a relatively simple schematic of the principal control components of an electronic scale required for the practice of the present invention.

Thus, the first step in practicing the invention is to place the scale with the platter 18 installed thereon on a horizontal surface at the site of origin which is under certain controlled physical and/or environmental conditions which can affect the accuracy of the scale calibration. Once this situation is established, the next step, as represented by Step 1 in FIG. 2, is to determine a first raw electronic count of the scale with the platter 18 installed thereon, but with 0# weight on the platter which is designated as WCO @0# in FIG. 2, and is 21,200 in the example given. With reference to FIG. 4, this is accomplished by the load cell 12 generating a predetermined voltage indicative of the weight of the platter 18. Basically, a load cell using strain gage technology can be a generally rectangular metallic body member which is adapted to have one end rigidly mounted on a frame so that the load cell is supported only at that end, with the rest of the body member being cantilevered from the mounting end. The other end of the body member is provided with some means for supporting a weight. Strain gages are mounted on the body member in appropriate locations that stretch or compress very slightly when the body member is deflected by the application of the weight. An electric voltage is applied across the strain gage circuit, the output of which varies in accordance with the extent to which the strip is strained by weight imposed on the free end of the body member. The output voltage is amplified by the amplifier 80 and transmitted to an analog to digital converter 82 which converts the analog voltage into a digital signal which can be recognized by a microprocessor 84 for further processing. In a manner known in microprocessor technology, the details of which are not necessary to an understanding of the invention, the microprocessor 84 converts the digital signal into a predetermined electronic count, which is transferred to and temporarily stored in the working memory register 86 of a multi-register memory component, indicated generally by the reference numeral 88. Thus, the raw electronic count WCO @0# of 21,200 for the platter 18 with 0# weight thereon is now stored in the working memory register 86.

The next step, represented by Step 2 in FIG. 2, is to place a known weight on the platter 18, which typically weighs from about one half to the same as the weight capacity of the scale, which in the scale disclosed herein is 5 pounds. A first raw electronic count of the scale with the known weight on the platter 18 is then determined in the same manner as just described for determining and storing the first electronic count of the scale with 0# weight on the platter 18. Thus, a raw electronic count for the platter 18 with the known weight thereon, identified as WCO @5# in FIG. 2, and which is 110,100, is also now in the working memory register 86.

The next step, represented by Step 3 in FIG. 2, is essentially a calculation carried out by the microprocessor 84 in which the microprocessor accesses the two raw electronic counts in the working memory register 86 and subtracts the first count from the second count to determine a first electronic count differential, which is designated as ΔWCO and is 88,900, and which represents the counts per known weight at the site of origin. This first electronic count differential is then placed in the first of a plurality of permanent memory registers, designated by the numeral 90 in FIG. 3.

The next step, represented by Step 4 in FIG. 2, is to remove the platter 18 from the scale and determine a first raw electronic count of the scale with the platter 18 removed, again in the same manner as described above in connection with Step 1. The raw electronic count thus generated for the scale with neither the platter 18 nor a known weight thereon, designated as PCO in FIG. 2 and which is 12,300, is then placed in the working memory register 86.

The next step, represented by Step 5 in FIG. 2, is to replace the platter 18 back onto the scale and determine a second raw electronic count of the scale with the platter 18 thereon, but with 0# weight on the platter. This is designated PCO @0# in FIG. 2, which should be the same 21,200 as determined in Step 1, and again this electronic count is placed in the working memory register 86.

The next step, represented by step 6 in FIG. 2, is again essentially a calculation carried out by the microprocessor 84 in which the microprocessor accesses the two new electronic counts in the working memory register 86 and subtracts the first count from the second count to determine a second electronic count differential, which is designated as ΔPCO and is 8,900 in the example given, and which represents the counts per platter at the site of origin. This second electronic count differential is then placed in the second of the plurality of permanent memory registers, designated by the numeral 92 in FIG. 4.

This completes the steps that are performed with the scale at the site of origin, and at this point the memory 86 contains the first electronic count differential between the weight raw counts of the scale with the platter thereon with 0# weight and 5# weight on the platter respectively, and the second electronic count differential between the platter counts of the scale with the platter removed from the scale and on the scale with 0# weight thereon respectively.

The next step, which is stated in FIG. 2 without a step number, is to remove the scale from the site of origin to a site of installation at which the scale may operate under physical and/or environmental conditions different from those which prevailed at the site of origin.

Once this is accomplished, the next step, as represented by Step 7 in FIG. 2, is essentially the same as Step 4 which was carried out at the site of origin, which is to remove the platter 18 from the scale and determine a first raw electronic count of the scale with the platter 18 removed, again in the same manner as described above in connection with Step 1. The raw electronic count thus generated, designated PCI and which is 11,800, is then placed in the Working memory register 86.

The next step, as represented by Step 8 in FIG. 2, is essentially the same as Step 5 which was carried out at the site of origin, and is to replace the platter 18 back onto the scale and determine a third raw electronic count of the scale with the platter 18 thereon, but with 0# weight on the platter, This count, designated as PCI @0# and which is 20,600, is then placed in the working memory register 86.

The next step, as represented by Step 9 in FIG. 2, is again essentially a calculation carried out by the microprocessor 84 in which the microprocessor accesses the two new raw electronic counts in the working memory register 86 and subtracts the first count from the second count to determine a third electronic count differential, which is designated as ΔPCI and is 8,800, and which represents the counts per platter at the site of installation. This third electronic count differential is then placed in the third of the plurality of permanent memory registers, designated by the numeral 94 in FIG. 4.

The next step, represented by Step 10 in FIG. 2, is a further calculating step carried out by the microprocessor 84 in which it accesses the first, second and third permanent memory registers 90, 92 and 94 respectively, and readjusts the first electronic count differential for any difference in physical and/or environmental conditions between the site of origin and the site of installation. This is done by multiplying the first electronic count differential by the ratio of the third electronic count differential to the second electronic count differential, which can be expressed by the formula:

$$WCI = \Delta WCO \times \frac{\Delta PCI}{\Delta PCO}$$

where WCI represents the new weight count at the site of installation. From the calculations shown for Step 10 in FIG. 2, it will be seen that the ratio factor for the scale is 0.9888, which means that a scale operating in the Denver location must reduce the first electronic count differential as determined in Step 3 by this ratio in order for the scale to indicate accurate weight. The new weight count WCI, which is shown in FIG. 2 to be 87,904, is then placed in the fourth of the plurality of permanent memory registers, designated by the numeral 96 in FIG. 4.

This completes the steps that are required to recalibrate the scale to accommodate any changes in the physical and/or environmental conditions from those at the site of origin to those prevailing at the site of installation. However, as previously mentioned, another aspect of the method of the present invention is that it can be extended beyond the recalibration of the scale to include a method of obtaining an accurate indication of the weight of an article at a site of installation, which includes all of the steps set forth above for carrying out the method of recalibrating the scale, plus additional steps which are carried out subsequent to completion of recalibrating the scale which cause it to provide an indication of the accurate weight of a mail piece of unknown weight at the site of installation.

Thus, with reference to FIG. 3, the first of the additional steps, represented as Step 11, is essentially the same as that represented by Step 8 in FIG. 2, which is to determine a fourth raw electronic count of the scale with the platter 18 thereon but with 0# weight on the platter. This count should have a similar 20,600 value as it did in Step 8, but is now designated WCI @0# because it will be compared to a weight count as set forth in the next step. This count is then placed in the working memory register 86.

The next step, which is not represented by a Step number in FIG. 3, is to place a mail piece of unknown weight on the platter 18.

The next step, represented by Step 12, in FIG. 3, is essentially the same as that represented by Step 2 in FIG. 2, is to determine a first raw electronic count of the scale with the mail piece of unknown weight on the platter 18. This count is designated UWCI, and is 61,700 in the example set forth, and this count is placed in the working memory register 86.

The next step, represented by Step 13 in FIG. 3, is again essentially a calculation carried out by the microprocessor 84 in which the microprocessor 84 accesses the two electronic counts in the working memory register 86 and subtracts the first count from the second count to determine a fourth electronic count differential, which is designated as ΔWCI and is 41,100, and which represents the counts per unknown weight of the mail piece on the platter 18. This fourth electronic count differential is then placed in the fourth of the plurality of permanent memory registers, designated by the numeral 98 in FIG. 4.

The next step, represented by Step 14 in FIG. 3, is a further calculating step carried out by the microprocessor 84 in which it accesses the fourth and fifth permanent memory registers 96 and 98 respectively, and calculates the unknown weight of the mail piece on the platter 18 in accordance with the recalibration factor stored in the memory from Step 10 in FIG. 2. This is done by multiplying the known weight utilized in Step 2 of the initial calibration procedure carried out at the site of origin, which as previously mentioned is a 5# weight for the type of scale under consideration, by the ratio of the fourth electronic count differential to the third electronic count differential, which can be expressed by the formula:

$$UWI = 5\# \times \frac{\Delta WCI}{WCI}$$

where UWI represents the unknown weight of the mail piece at the site of installation. From the calculations shown for Step 14 in FIG. 3, it will be seen that the ratio factor for the unknown weight of the mail piece is 0.4675, which yields a weight for the mail piece of 2.3375#.

As a final step, the UWI is converted by the microprocessor 84 from digital count form to information recognizable by a digital display 100 of the scale for driving the digital readout to cause it to display the actual weight of the mail piece.

Thus, with the series of Steps 11 through 14 added to those previously described for recalibrating the scale, the digital display will accurately display the weight of the mail piece placed on the scale regardless of any variations in the physical and/or environmental conditions between the site of origin and the site of installation.

It is to be understood that the method of the present invention are not to be considered as limited to the practice of the specific steps described above, which are merely illustrative of the best mode presently contemplated for carrying out the method of the invention and which are susceptible to such changes as may be obvious to one skilled in the art, but rather they are intended to cover all such variations, modifications and equivalents thereof as may be deemed to be within the scope of the claims appended hereto.

What is claimed is:

1. A method of recalibrating an electronic scale to indicate accurate weight measurements of the scale regardless of variations in the physical and/or environmental conditions under which the scale is operating between a site of origin and a site of installation which tend to adversely affect accurate weight, said method comprising the steps of:

(a) placing the scale with a platter installed thereon on a horizontal surface at a site of origin having certain controlled physical and/or environmental conditions;

(b) determining a first electronic count differential between the scale with zero (0) weight on the platter and with a known weight thereon and placing said first electronic count differential into a memory;

(c) determining a second electronic count differential between the scale with the platter removed and with the platter replaced thereon and placing said second electronic count differential into the memory;

(d) removing the scale from the site of origin to a site of installation at which the scale may operate under physical and/or environmental conditions different from those which prevailed at the site of origin;

(e) determining a third electronic count differential between the scale with the platter removed and with the platter replaced thereon and placing said third electronic count differential into the memory; and (f) readjusting said first electronic count differential by the product of said first electronic count differential and the ratio of said second electronic count differential to said third electronic count differential, which product is a measure of the degree of error between the reading of the scale with the known weight thereon at the site of origin and the reading of the scale if the same known weight were placed on the scale at the site of installation;

whereby when object of unknown weight is placed on the scale platter at the site of installation, the electronic count differential between the scale with zero (0) weight thereon and with an unknown weight thereon is recalculated according to said product of said first electronic count differential and said ratio of said second electronic count differential to said third electronic count differential.

2. A method as set forth in claim 1 wherein the step of determining said first electronic count differential comprises the steps of:

A. determining a first electronic count of the scale with the platter installed thereon but with 0# weight on the platter, B. placing a known weight on the platter, C. determining a first electronic count of the scale with the known weight thereon, and D. subtracting the first electronic count of the scale with 0 weight on the platter from said first electronic count of the scale with the known weight on the platter.

3. A method as set forth in claim 2 wherein the step of determining said second electronic count differential comprises the steps of:

A. determining a first electronic count of the scale with the platter removed therefrom, B. determining a second electronic count of the scale with the platter installed thereon but with 0 weight on the platter, and C. subtracting said first electronic count of the scale with the platter removed therefrom from said second electronic count of the scale with 0 weight on the platter.

4. A method as set forth in claim 3 wherein the step of determining said third electronic count differential comprises the steps of:

A. determining a second electronic count of the scale with the platter removed therefrom, B. determining a third electronic count of the scale with the platter installed thereon but with 0 weight on the platter, and C. subtracting said second electronic count of the scale with the platter removed therefrom from said third electronic count of the scale with the platter installed thereon but with 0# weight on the platter.

5. A method of obtaining an accurate indication of the weight of a mail piece by an electronic scale at a site of installation regardless of variations in the physical and/or environmental conditions under which the scale is operating between a site of origin and the site of installation which tend to adversely affect accurate weight, said method comprising the steps of:

(a) placing the scale with a platter installed thereon on a horizontal surface at a site of origin having certain controlled physical and/or environmental conditions;

(b) determining a first electronic count differential between the scale with zero (0) weight on the platter and with a known weight thereon and placing said first electronic count differential into a memory;

(c) determining a second electronic count differential between the scale with the platter removed and with the platter replaced thereon and placing said second electronic count differential into the memory;

(d) removing the scale from the site of origin to the site of installation at which the scale may operate under physical and/or environmental conditions different from those which prevailed at the site of origin;

(e) determining a third electronic count differential between the scale with the platter removed and with the platter replaced thereon and placing said third electronic count differential into the memory;

(f) readjusting said first electronic count differential by the product of said first electronic count differential and the ratio of said second electronic count differential to said third electronic count differential, which product is a measure of the degree of error between the reading of the scale with the known weight thereon at the site of origin and the reading of the scale if the same known weight were placed on the scale at the site of installation;

(g) placing a mail piece of unknown weight on the platter of the scale;

(h) determining a fourth electronic count differential between the scale with zero (0) weight on the platter and with the mail piece of unknown weight on the platter and placing said fourth electronic count differential into the memory;

(i) calculating the unknown weight of the mail piece by multiplying the known weight placed on the scale platter at the site of origin by the ratio of the fourth electronic count differential to the third electronic count differential; and (j) converting said unknown weight to information recognizable by a digital readout to cause it to display the actual weight of the mail piece;

whereby the digital readout will accurately display the weight of the mail piece at the site of installation regardless of any variations in the physical and/or environmental conditions between the site of origin and the site of installation.

6. A method as set forth in claim 5 wherein said step of determining said fourth electronic count differential comprises the steps of:

A. determining a fourth electronic count of the scale with the platter installed thereon but with 0# weight on the platter, B. placing the mail piece of unknown weight on the platter, C. determining a first electronic count of the scale with the mail piece of unknown weight on the platter, and D. subtracting said fourth electronic count of the scale with 0# weight on the platter from said first electronic count of the scale with the mail piece of unknown weight on the platter.

* * * * *